United States Patent [19]
Leszczynski

[11] Patent Number: 4,833,627
[45] Date of Patent: May 23, 1989

[54] COMPUTERIZED TYPESETTING CORRECTION SYSTEM

[75] Inventor: Tomasz Leszczynski, Brooklyn, N.Y.

[73] Assignee: The Toles Group

[21] Appl. No.: 902,295

[22] Filed: Aug. 29, 1986

[51] Int. Cl.⁴ ............................................. G06F 15/68
[52] U.S. Cl. ..................................... 364/523; 382/56; 340/747; 364/518
[58] Field of Search ............... 364/521, 523, 519, 518; 382/56; 340/744, 747

[56] References Cited

U.S. PATENT DOCUMENTS

| | | | |
|---|---|---|---|
| 4,148,009 | 4/1979 | Witthandt | 382/18 |
| 4,338,673 | 7/1982 | Brown | 364/523 |
| 4,345,245 | 8/1982 | Vella et al. | 340/744 |
| 4,511,893 | 4/1985 | Fukuda | 340/747 |
| 4,604,712 | 8/1986 | Orrhammar | 364/900 |
| 4,608,664 | 8/1986 | Bartlett et al. | 364/900 |
| 4,627,002 | 12/1986 | Blum et al. | 364/519 |
| 4,630,309 | 12/1986 | Karow | 382/56 |
| 4,675,830 | 6/1987 | Hawkins | 364/518 |
| 4,679,153 | 7/1987 | Robinson et al. | 364/523 |
| 4,682,189 | 7/1987 | Purdy et al. | 364/523 |

OTHER PUBLICATIONS

Seybold Publications, "Seybold Report on Publishing Systems", 1987.
Leszczynski, "Toles System", 1986.

Primary Examiner—Gary V. Harkcom
Assistant Examiner—Randy W. Lacasse
Attorney, Agent, or Firm—Jordan B. Bierman

[57] ABSTRACT

A digital typesetting correction system assembles lines of characters for typesetting and applies a correction program which identifies characters in combination pairs having contour elements to be corrected. The system automatically corrects the contour elements of characters in identified combination pairs appearing in a text for tighter spacing or a better visual appearance. The correction program has correction functions for reducing the width of a bar of a character, contracting a serif, defining the edge contour of a character to be parallel to the edge contour of an adjacent character, or applying any combination of these functions in accordance with specified percentage amounts. The system includes a memory for storing correction tables specifying particular correction parameters for specific combination pairs. In a design mode, a character, a set of characters, or parts of characters are designed and stored for later recall.

25 Claims, 18 Drawing Sheets

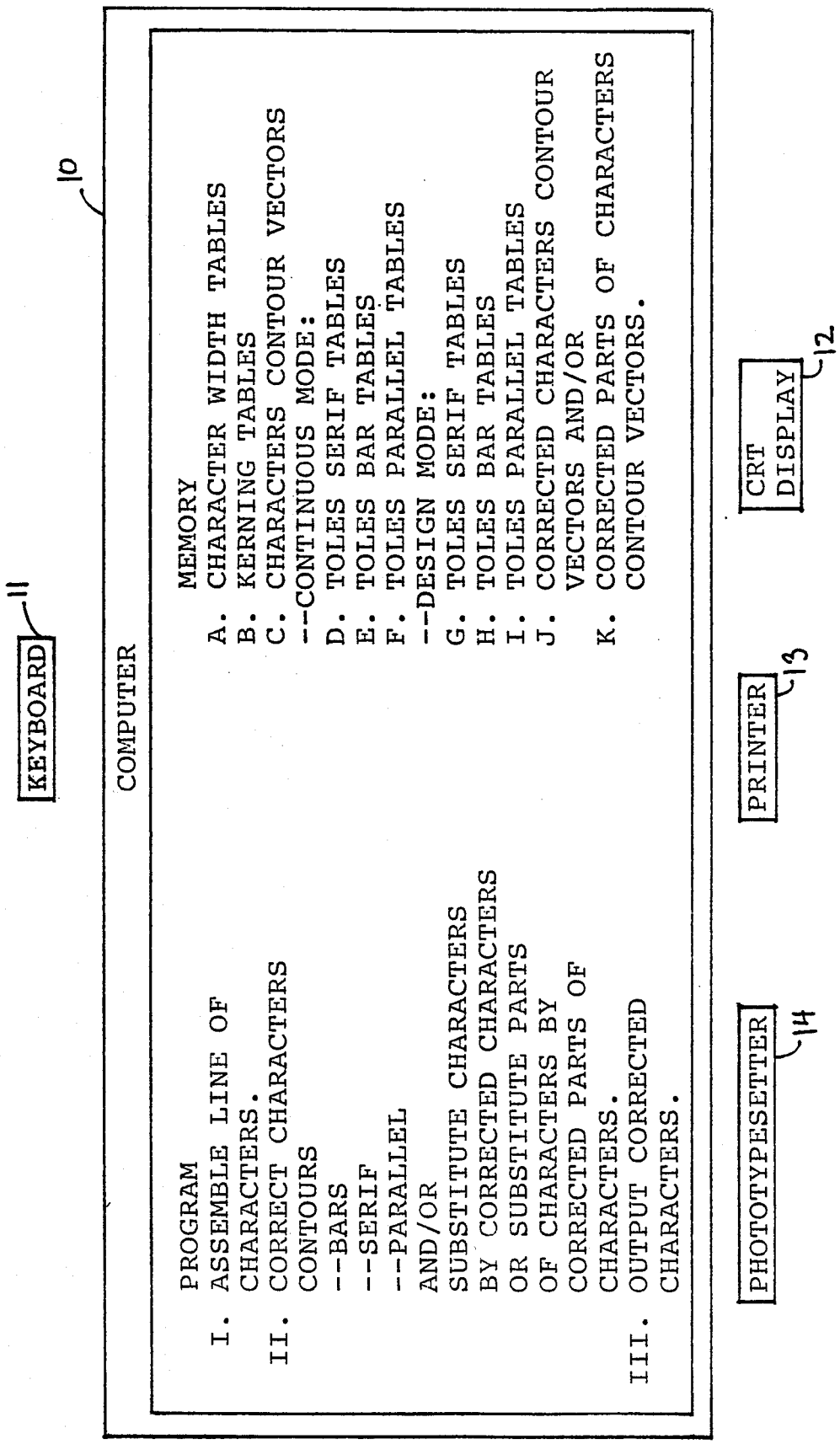

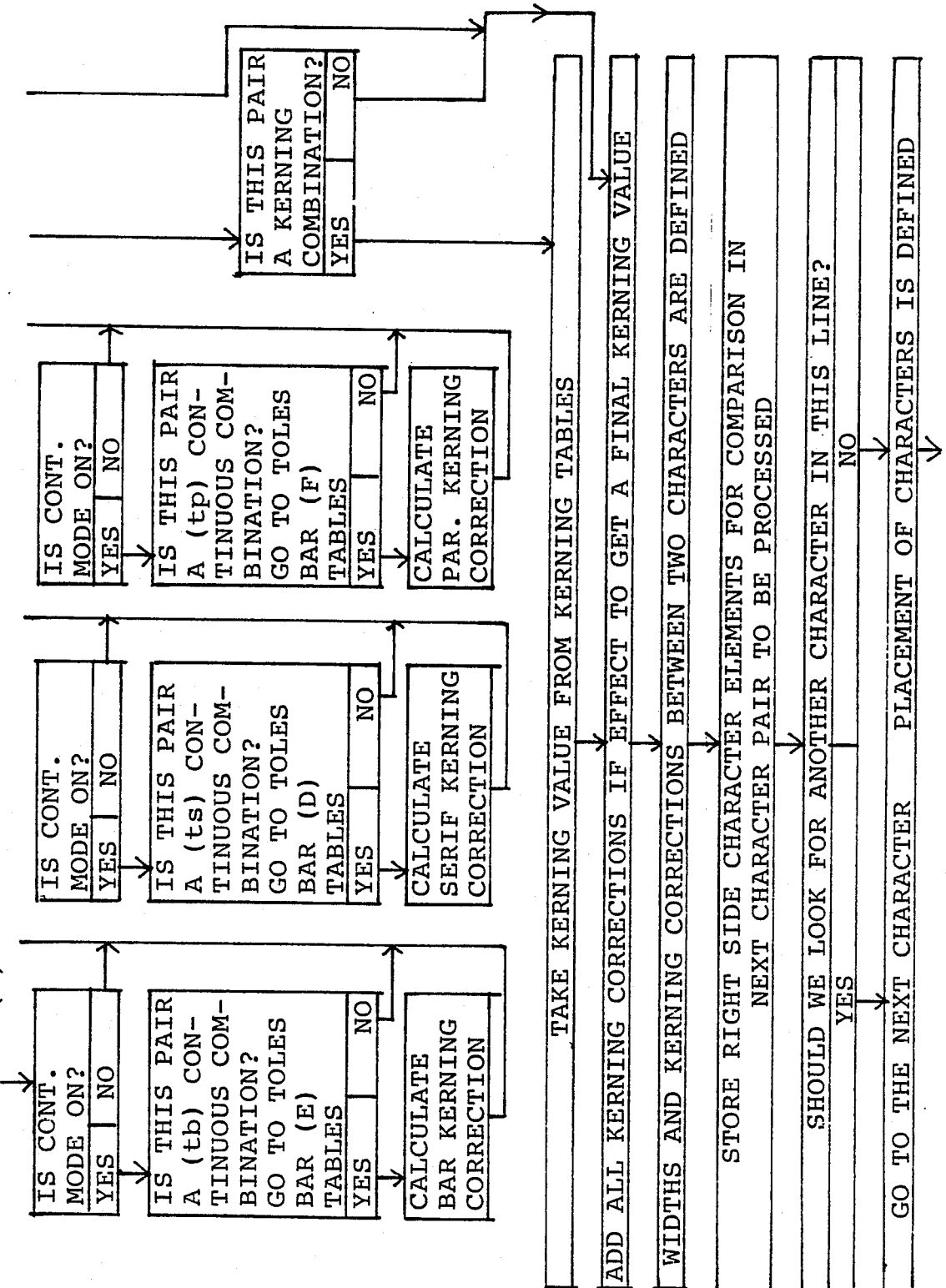

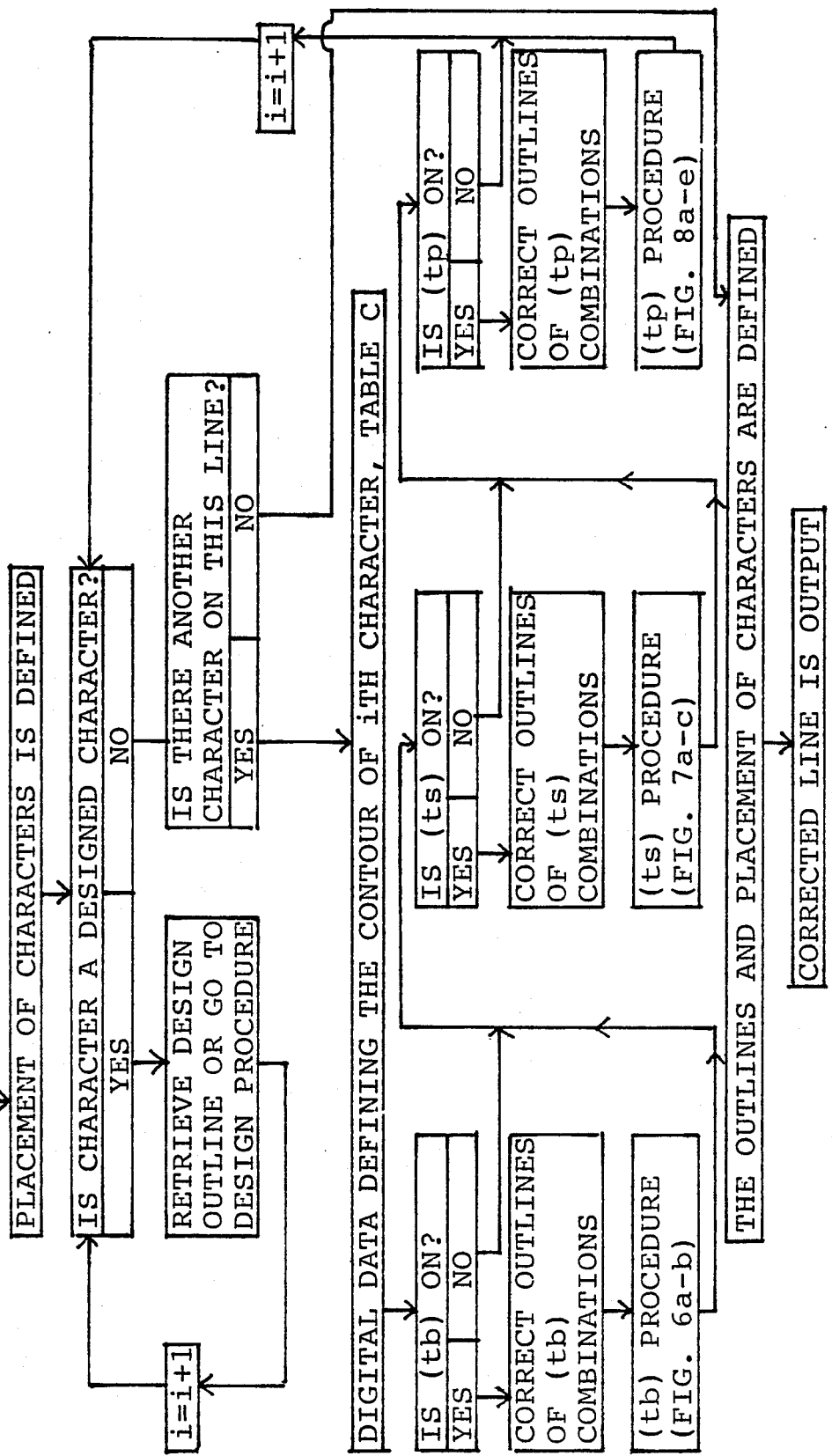

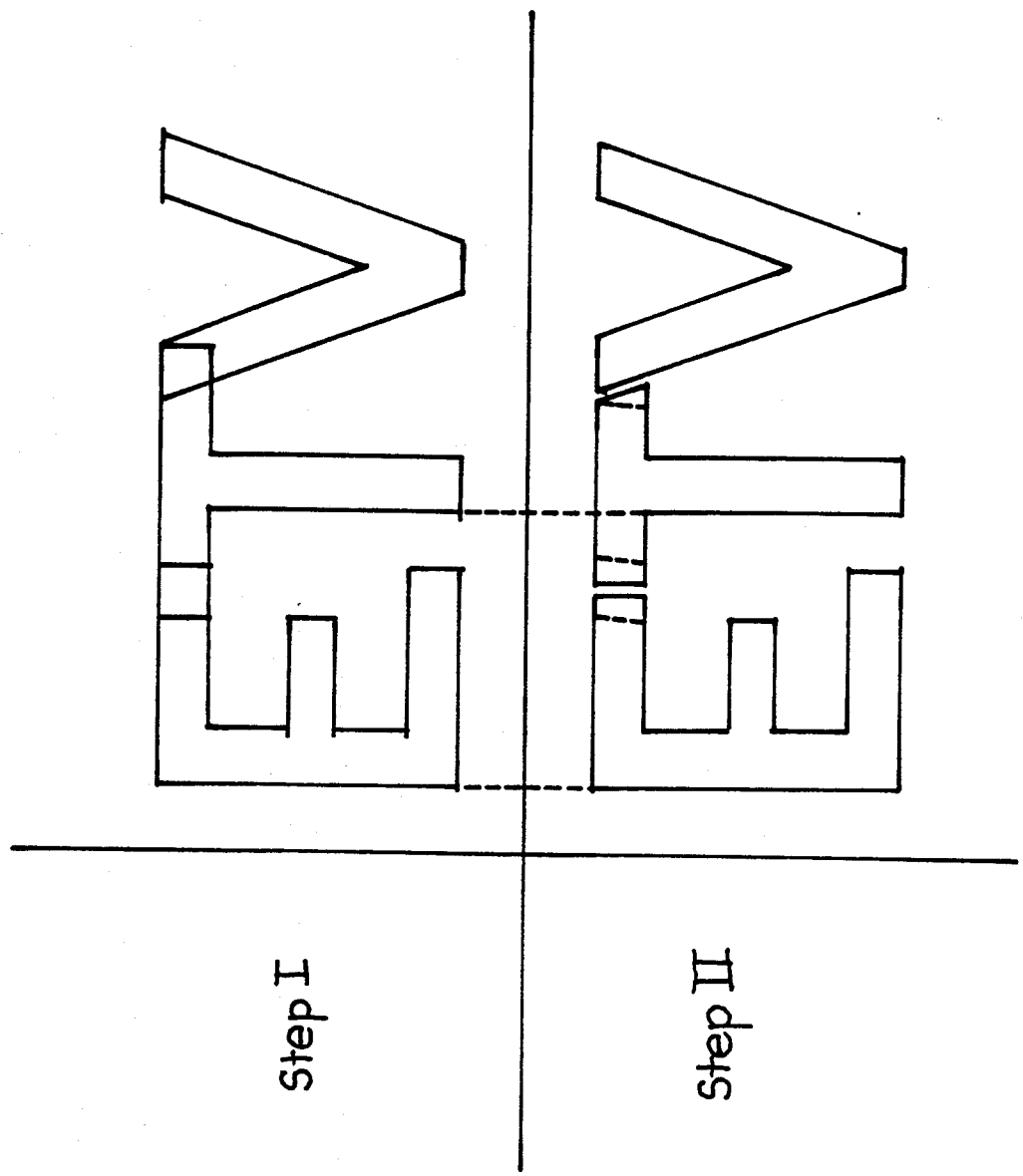

BAR CORRECTION PROCEDURE

FOR EACH BAR TO BE CORRECTED IN CHARACTER "E" TAKE VECTORS IN OUTLINE BETWEEN TWO TOLES BAR POINTS E-1 AND Ei-2
$\sum E_{i-1}, E_{i-2}$
→
DEFINE f(x) AS LINEAR CONDENSATION ALONG x-AXIS BY
f(x)-max (m, t × tb%)
→
CORRECTED CONTOUR BECOMES
$f(\sum E_{i-1}, E_{i-2})$

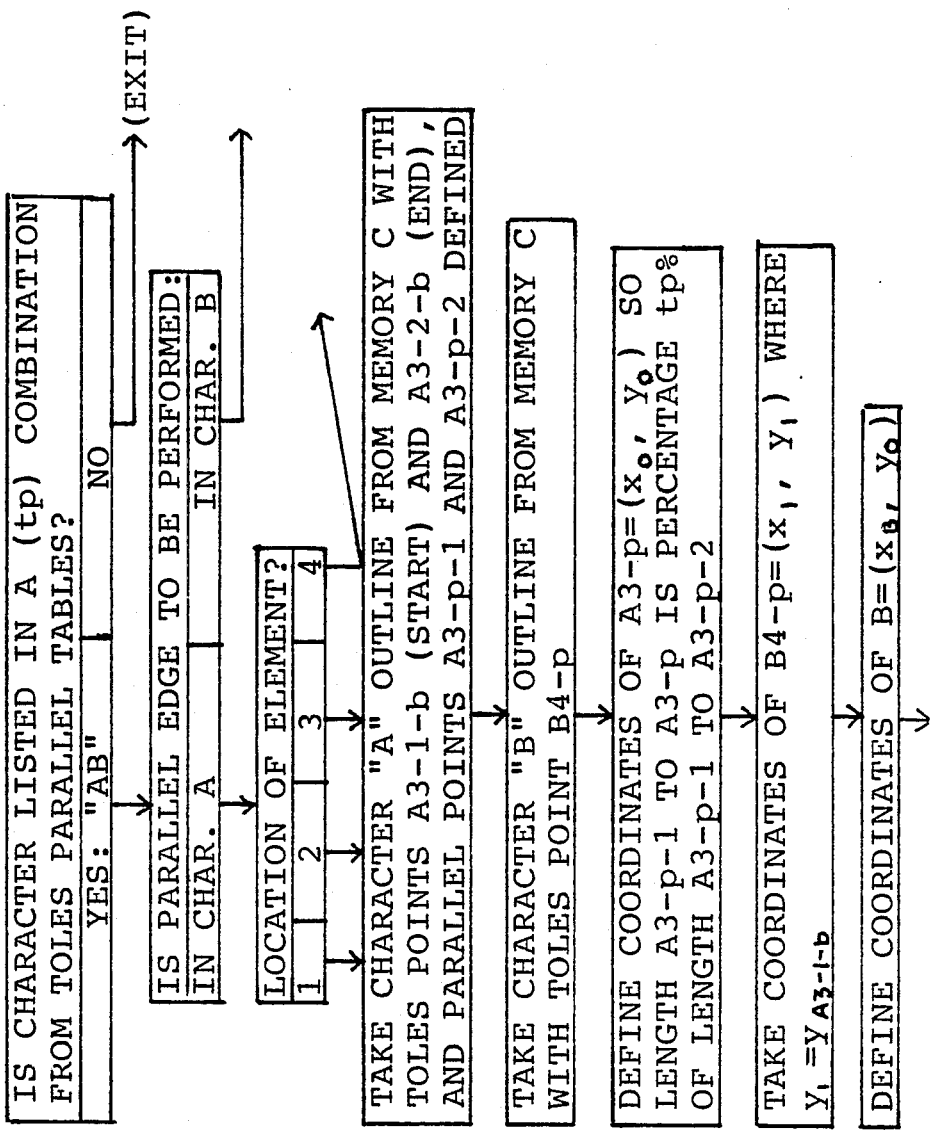
FIG. 8(a) PARALLEL CORRECTION PROCEDURE

FROM FIG. 8(a)

DEFINE COORDINATES OF B = $(x_B, y_0)$

DEFINE LINEAR FUNCTION $f(B_i)$ FOR EACH $B_i(x_i, y_i)$
WHERE $y_i \geq y_{Bi} \geq y_0$ AND $f(x_i, y_i) = (x_i - (x_B - x_0), y_i)$ THE CORRECTED OUTLINE OF ELEMENT 3
OF CHARACTER A CONSISTS OF OUTLINE POINTS/VECTORS
A3-1-b (START) TO $A(x_A, y_1) = f(B4-p)$
TO $f(B) = A3-p$ TO A3-2-b (END)

No correction

L (tb 15%)

A (ts 50%)

L (tp 50%)
A (ts 50%)

L (tb 15%, tp 50%)
A (ts 50%)

COMPUTERIZED TYPESETTING CORRECTION SYSTEM

BACKGROUND OF THE INVENTION

The present invention relates to a computerized typesetting system and, in particular, to an apparatus for computerized correction of type characters in a digital typesetting system.

Digital typesetting systems in commercial use employ computers to retrieve digital representations of characters of selected typestyles and produce an output of characters of typeset quality. For example, U.S. Pat. No. 4,231,096 shows a digital typesetter processing system in which parameters defining the typestyle, point size, spacing, and placement of characters are entered, normalized characters are retrieved from stored digital representations, the spacing and position of the characters are calculated for a given line width, and output character contours are derived by applying the typesetting parameters to the normalized characters. There are also various systems for modifying the shape of characters, for example, by horizontal and vertical scaling, such as disclosed in U.S. Pat. No. 4,029,947. In character generating systems, computers are also used to alter the overall shape of characters or to vary the density or aspect ratio of characters according to user specifications.

However, digital typesetting systems heretofore have not had the capability to modify parts of a character that are placed next to those of an adjacent character in order to produce a sharper or more pleasing visual appearance of a block of text. That is, characters of a particular typestyle have certain elements, such as the width of horizontal bars, serifs, or the contours of the edges, which may have a negative visual impact when viewed in juxtaposition to the elements of an adjacent character. For conventional systems, only one representation of a given character is available, regardless of the adjacent character combinations in which the character can occur. Some relatively simple procedures are used for condensing, slanting, etc. a block of text. Procedures for altering the letter spacing between particular pairs or triplets of characters, called "kerning", are also known.

If modification of the fit or contour of the elements of adjacent characters is desired, it is carried out manually by a graphic artist who cuts and pastes the modifications from standard character specimens. Since this is a very time consuming process, such modifications are not used in high volume typesetting jobs. Manual correction also provides little flexibility for the graphic artist to experiment with the visual appearance of different degrees of character element correction.

For some frequent character combinations, such as "ff", "fl", "fi", "ffi" or "ffl", the problem is met by using "ligatures", i.e. sets of two or three characters designed as a unit to replace visually awkward combinations. However, the use of predesigned ligature sets is limited to the specific combinations of characters, point sizes, letter spacing, etc. for which they have been designed. If the original ligature for a given text size is simply enlarged to a bigger size, the spaces in between the letters may be too large for a tight appearance, so that it is sometimes necessary to redesign the ligatures for specified point sizes separately. Ligatures replace only 5 out of 676 combinations for lower case characters in an average font. There are many other awkward lower and upper case combinations which could be but are not conventionally corrected.

SUMMARY OF THE INVENTION

In view of the aforementioned disadvantages of conventional digital typesetting systems, it is a principal object of the invention to provide a computerized correcting system for a digital typesetter which provides the user a quick, efficient, and flexible way to modify parts of the contour of adjacent characters for a sharper or more pleasing visual appearance. In particular, the invention seeks to provide a computerized system for continuous and automatic correction of the contours of certain character combination pairs appearing within a text to be typeset. It is a particular object to make such corrections based upon selected tables of combination pairs stored in memory and to provide various functions for selectively making the corrections in a continuous mode of operation. A further object is to provide for designing specific corrections for a given character or character combinations and storing them for future use in the continuous correction mode.

In accordance with the invention, a digital typesetting system assembles lines of characters for typesetting and applies a correction program which identifies pairs of adjacent characters which have elements whose contours are to be corrected in accordance with specified correction functions. The correction program corrects the elements of one or both characters by applying correction parameters stored in memory to the specified correction functions. The system automatically corrects the contours of characters for each line of text and outputs the corrected lines for display, printing or phototypesetting. The correction functions for a given character combination can be modified in degree of correction or turned off, as desired, and the correction parameters for a character combination can be established and/or stored for later use.

In a preferred embodiment, the correction program has subroutines for the correction functions of shortening the width of a bar of a character, condensing a serif, defining the edge contour of a character to be parallel to the edge contour of an adjacent character, or applying any combination of these subroutines in accordance with specified percentage amounts. The program can also store particular correction parameters for character combinations for later recall.

The invention thus allows the contours of selected character combination pairs to be corrected automatically, with a high degree of flexibility, and great savings of time. Due to the flexibility of specifying the desired character combinations to be corrected in stored tables, a character can have different contours automatically defined on each side for different character combinations in order to produce the most pleasing or legible result in each instance. Moreover, liberal use can be made of tight or overlapping character sets or spacings since the lines of characters of a text are continuously and automatically corrected by the correction program. In the design mode, different representations of a given character or parts of a given character are designed and stored, and then recalled for automatically changing input characters.

Another object of the invention is to provide manual typesetting tools which use the correction methods of the invention, such as in the form of a template for correcting representations of characters to be manually typeset, and a typositor mask tool for correcting representations of character in photographic typesetting.

BRIEF DESCRIPTION OF THE DRAWINGS

The above objects, features, and advantages of the invention are described in detail below, in conjunction with the drawings, of which:

FIG. 1 is a schematic diagram of a digital typesetting system having a correction program in accordance with the present invention;

FIGS. 4(a)-(b) are flow charts of one embodiment of the correction program of the invention incorporating subroutines for correcting bars, serifs, and parallel edges;

FIG. 5(b) shows an example of the application thereof;

DETAILED DESCRIPTION OF AN EXEMPLARY EMBODIMENT

Figure 2D:
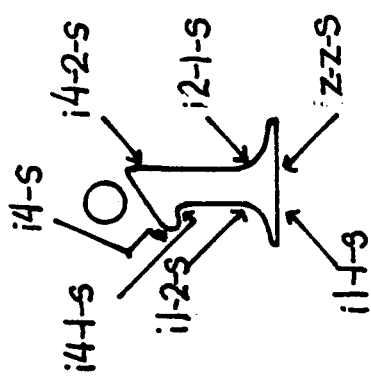
FIGS. 2(a)-(d) illustrate examples of contours for various characters and the different elements thereof which can be specified for correction.
Figure 2C:
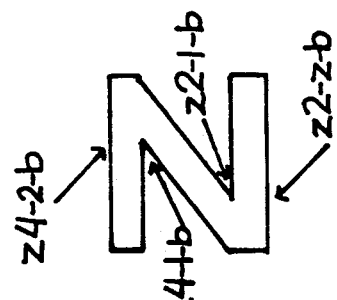

The correction program of the invention is adapted to be used in conjunction with conventional computer typesetting systems which have a memory for storing digital representations of characters of selected typestyles, and which output lines of characters of selected typestyle according to selected point sizes, line widths, letter spacings, justification modes, etc. To distinguish the functions of the invention from those of the conventional typesetting program, the coined word "Toles" will be used herein to designate the correction program, functions, parameters, and data. Thus, the correction program is referred to as the "Toles" program, character combinations as "Toles" pairs, correction functions as "Toles" functions, correction parameters as "Toles" parameters, and correction data as "Toles" data or tables.

In a typical computer typesetting system, each line of characters is assembled by a program which computes the widths of characters and adjusts the letterspacings, wordspacings, hyphenation, etc. in order to fill a given line width. The spacing adjustments are made by program using character width and spacing correction data stored in kerning tables. The correction (Toles) program of the invention operates in conjunction with the existing programs by identifying if a Toles pair is present, calculating the kerning correction for the Toles pair, redefining the corrected contours of the characters according to Toles correction subroutines and specified Toles parameters, and then outputting the corrected line of characters. In conventional typesetting systems, characters are defined by their inner and outer contours and various algorithms are employed for defining the actual coordinates of the points on the contour and to fill the space encompassed by the contours. In the invention, the Toles correction program is used to redefine the contours of the corrected characters.

Described herein is one preferred embodiment of a correction program for a digital typesetting system which computes character placements line-by line, and which uses three Toles correction functions, i.e. for bars, serifs, and parallel edges. The invention is also applicable to manual typesetter tools, and a Toles template for manual typesetting and a Toles typositor tool for photographic typesetting are also described illustratively. However, it should be understood that other types of digital typesetting systems, correction functions, and typesetting tools can be readily adapted to the principles of the present invention.

In FIG. 1, a digital typesetting system employs computer 10 which interfaces with a display, such as keyboard 11 and CRT 12, and provides a finished output through printer 13 and/or phototypesetter 14. The system may of course use other peripheral devices, such as a mouse, digital tablet, or touch screen, which are conventionally known. Computer 10 has an operating program for digital typesetting and Toles correction, and an associated memory for storing correction data, such as the random access memory of the computer in conjunction with a large capacity hard disk. The main steps of the program are (I) computing the placements of characters to be assembled for a line of characters; (II) defining corrected contours for Toles pairs in the line of characters; and (III) providing an output of corrected contour vectors for the line of characters.

Data on character widths are stored in Character Width Tables in memory portion A. Data for spacings between characters are stored on Kerning Tables in memory portion B. Digital representations of the normalized contours of characters of a type font are stored as character contour vectors in memory portion C. Data defining the correction of bar, serif, or parallel edge elements to be performed for identified adjacent character pairs are specified in Tables D-F. For characters or parts of characters which are specifically designed and to be used regardless of the main correction procedures, the designed contours and kerning data are stored in memory portions J and K.

The Toles correction program is generally intended to operate on certain elements of combination pairs of adjacent characters to modify them so that the visual appearance of a character next to the adjacent character on its left and/or right is visually pleasing. The basic rules of good typography are:
1. Legibility: the characters should not touch.
2. Optical spacing between characters should be equal.
3. Letter spacing should be relatively tight.

The combinations of character pairs which require correction to achieve an improved visual appearance are listed on Toles tables identifying the elements of the characters to be corrected. In this embodiment, Toles Serif, Bar, and Parallel Tables are stored in memory portions D, E and F, for the continuous correction mode, and in memory portions G, H and I, for the design mode, respectively. For example, pairs such as "LA" or "EV" would be listed on the Toles tables according to the elements of the pairs desired to be corrected. During the operation of the typesetting system, the Toles correction program is executed within a conventional typesetting program to assemble a line of characters and define their placements and outlines. The widths and spacings of the characters on a line are determined by reference to the Character Width Tables A and Kerning Tables B. When a Toles combination pair is present, the Toles correction program accesses the Toles Serif, Bar, and/or Parallel Tables D-F or the design memory Tables G-I to identify which elements of the adjacent characters are to be corrected or substituted and by what amounts.

Figure 2B:
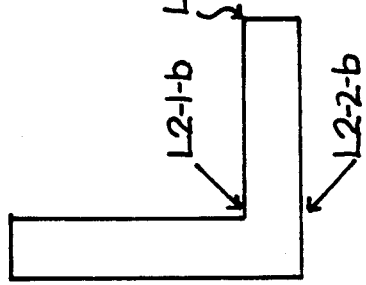
Figure 2A:
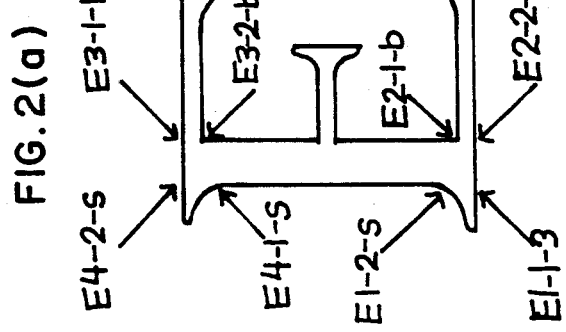

Examples of character elements which may be listed on Toles tables for correction are shown in FIGS. 2(a)–(d) as: (1) lower left side serifs or bars; (2) lower right side serifs or bars; (3) upper right side serifs or bars; and (4) upper left side serifs or bars. These correctable elements (1)–(4) for each character are identified by character, element position, starting (1) and end (2) points, and type of element. For example, the upper left serif elements of the letter "E" in FIG. 2(a) is defined by Toles starting point E4-1-s and ending point E4-2-s, or the lower right bar of the letter "L" in FIG. 2(b) is defined by point L2-1-b to point L2-2-b.

Figure 3B:
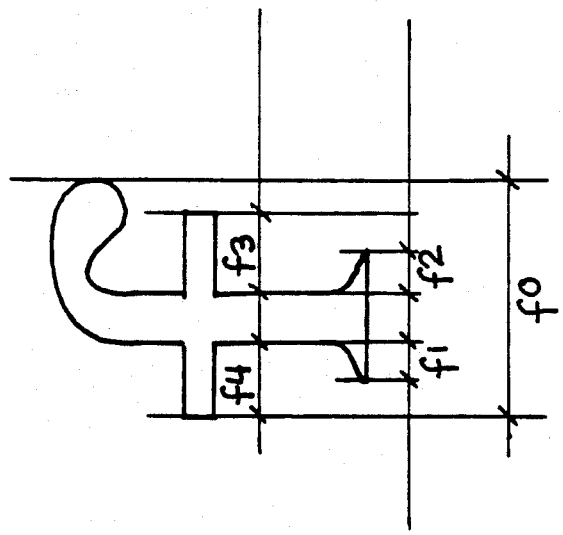
FIGS. 3(a)-(b) illustrate examples of the widths of certain elements of representative characters.
Figure 3A:
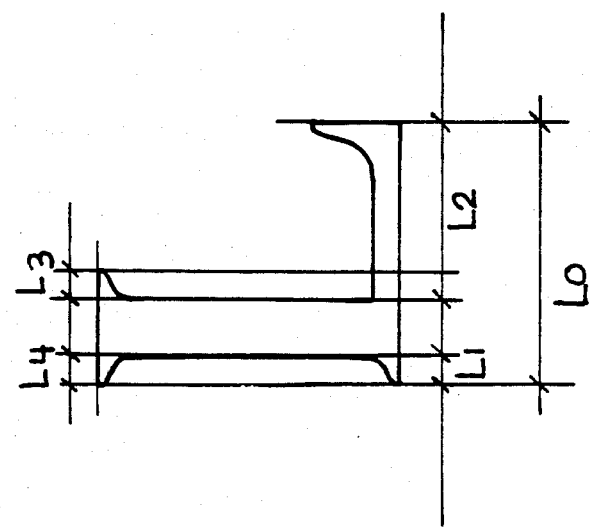

The widths of the character elements are specified on the Toles Width Tables A along with the overall width of a character. For example, the upper case "L" in FIG. 3(a) is specified by overall width L0, lower left serif width L1, lower right bar width L2, upper right serif width L3, and upper left serif width L4. As another example, the lower case "f" in FIG. 3(b) is specified by overall width f0, lower left serif width f1, lower right serif width f2, upper right bar width f3, and upper left bar width f4. In the Toles Width Tables, these characters would be listed as L/L1/L2/L3/L4 and f/f0/f1/f2/f3/f4.

The elements of a character are corrected for certain combination pairs by shortening the bar widths and/or condensing the serif contours according to selected percentage amounts. The edge contours of an element of one character can also be corrected to be parallel to that of an adjacent character, as shown in FIG. 9(e) in which the edge contour of the lower right bar of the letter "L" is made parallel with that of the lower left serif of the adjacent letter "A" in serif typeface.

The correction data for the continuous mode for combination pairs are listed on Toles Bar Tables, Serif Tables, and Parallel Tables stored in memory portions D-F. For example, for each combination pair where a bar correction is to be effected, such as the pair "AB", a listing may be specified in the Toles Bar Tables in the following form:

AB/a/b/t/M/m, where:
AB is the combination pair;
a is a bar (element 1,2,3 or 4) to be corrected in letter "A";
b is a bar (element 1,2,3 or 4) to be corrected in letter "B";
t is an adjustment factor which modifies the correction amount;
M is a maximum permissible bar correction in letter "A"; and
m is a maximum permissible bar correction in letter "B".

The Toles Bar Tables thus specify for a combination pair, "AB" in the above example, which bar element of which character is to be corrected. A general bar correction amount tb % is input at the start of the correction program, but it can later be automatically modified by the "t" factor specified for a particular combination pair. For example, if t=1, tb % is unchanged, if t=0, no bar correction is effected; if t is some fraction in between 1 and 0, the bar correction amount is correspondingly reduced. The bar correction amount tb % is also subject to a maximum limit "M" or "m" for one or both of the characters. That is, for $M \geq tb$ %, the correction tb % is carried out, and for $M < tb$ %, the correction M is carried out. The use of the adjustment factor and maximum limits allow inelegant bar shapes to be avoided for particular combination pairs without stopping the general application of the tb % amount for bar correction of other combination pairs.

Similarly, the correction parameters are specified on the Toles Serif Tables for each combination pair where a serif correction is to be effected, for example, in the following form:

AB/a/b, where:
AB is the combination pair;
a is a serif to be corrected in letter "A"; and
b is a serif to be corrected in letter "B".

The correction parameters for each combination pair where a parallel contour correction is to be effected are also specified on the Toles Parallel Tables as follows:

AB/a+/b/T, or AB/a/b+/T, where:
AB is the combination pair;
a is an element in letter "A" whose contour is traced;
a+ is an element in letter "A" whose contour is corrected;
b is an element in letter "B" whose contour is traced;
b+ is an element in letter "B" whose contour is corrected; and
T is the kerning value for a maximum (100%) correction.

In parallel correction, the contour of an element of one character is defined to be parallel to the contour of the adjacent element of the other character. Thus, only one character will have an element corrected parallel In the correction program, the above described correction functions obtain the objectives of good typography by shortening bars and serifs to obtain a tight spacing between letters while maintaining equal optical spacing between letters, and ensure that the parts of the characters do not touch each other. The edge contours of adjacent elements are defined parallel to each other in order to provide a pleasing appearance of equal optical spacing. However, it should be understood that other elements and correction functions can also be defined and used.

The operation of the correction program will now be described. As in conventional typesetting systems, the user inputs through keyboard 11 the specifications for a desired typestyle, point size, letterspacing, wordspacing, line breaks, placement formats, etc., for a text to be typeset at the appropriate entry point of the typesetting program. The user also enters whether the Toles bar correction function (tb), serif correction function (ts), and/or parallel correction furnace (tp) are to be applied and the percentage amount tb %, ts %, and tp %, respectively, for each type of correction, for example:

[tb 50%], [ts 80%], [tp 50%].

Figure 4A:
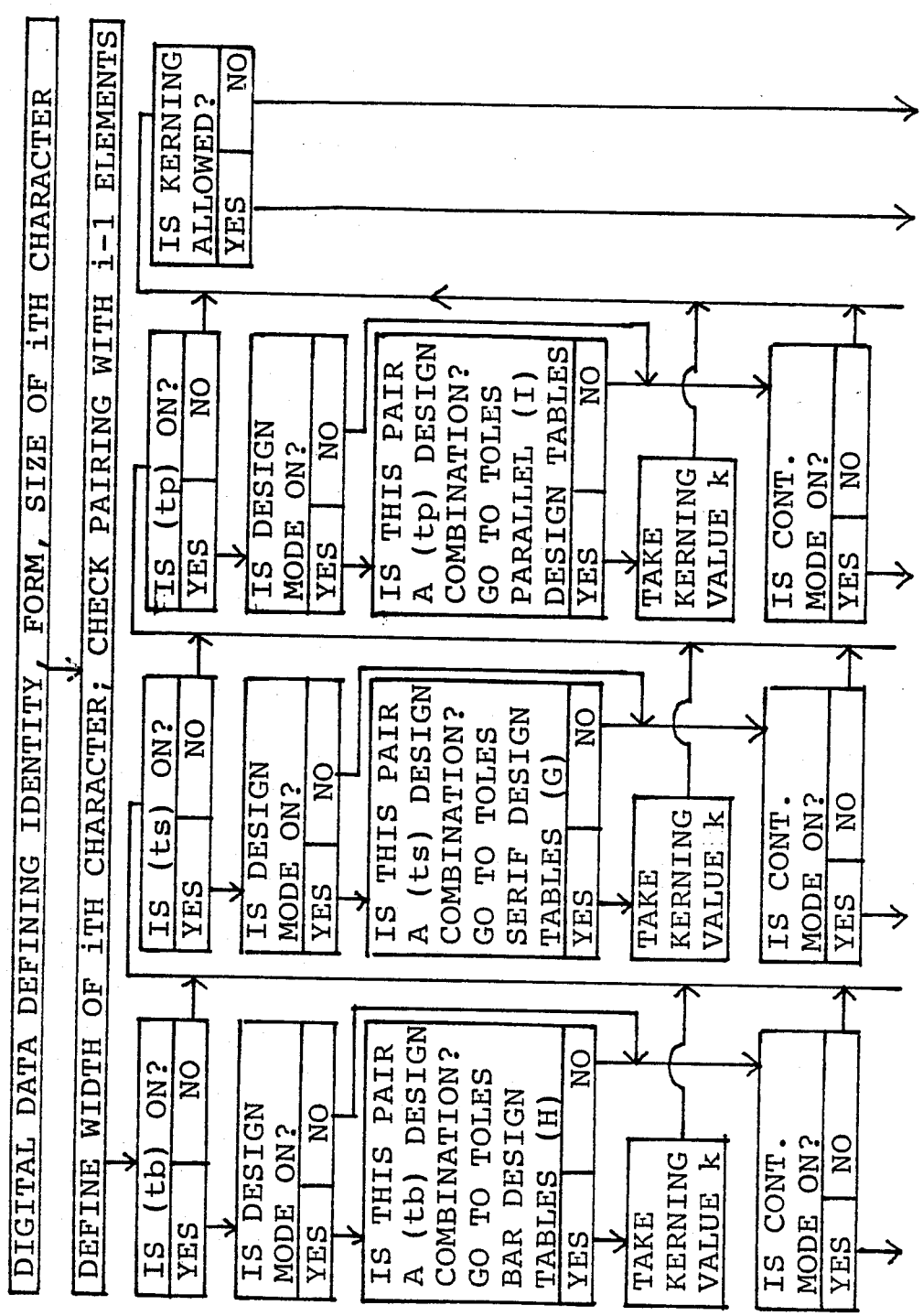

In step (I) of the typesetting program, the identity, form, and size of each character is sequentially determined in order to assemble it in a line of text, in the same manner as is done by conventional typesetting programs. As illustrated in FIGS. 4(a)-(b), the correction program of the invention operates within the conventional program to serially check for each character processed whether the bar, serif, and/or parallel correction functions are specified, and if so, whether the present (first) character and a next (second) character is part of a Toles combination pair listed on the Toles tables in memory portions D-F.

If the combination is a pair which requires correction, the program calculates the kerning correction which will result from the bar, serif, and/or parallel correction, based upon the correction parameters listed on the Toles tables. The kerning amount due to a Toles bar correction is the sum of the corrections to designated bar elements to be corrected as specified on the Toles Bar Tables. The kerning correction for each element is the higher of the maximum specified bar correction or the tb % amount, multiplied by the t factor, applied to the width of the bar element to be corrected:

$$(Ai) \times max(M, t \times tb \%) + (Bj) \times max(m, t \times tb \%),$$

Ai is the width of bar "i" listed on the Toles Width Table; Bj is the width of bar "j" listed on the Toles Width Table; M,m is the maximum correction amount on the Toles Bar Table; and t is the factor for modifying bar correction percentage tb %.

The serif kerning correction amount is simply the ts % correction amount applied to one or both of the serif elements to be corrected:

$$[(Ai) + (Bj)] \times ts \%.$$

The parallel kerning correction amount is the maximum kerning value T multiplied by the tp % amount, i.e.:

$$T \times tp \%.$$

Thus, if any of the functions (tb) or (ts) is indicated, the program looks up the widths of the bars or serifs on the Toles Width Tables and the correction parameters specified on the Toles Bar or Serif Tables and calculates the amount of kerning correction. If the function (tp) is specified, the program calculates the kerning correction for the right side of the present character or the left side of the next character based upon the parallel correction function as applied to one character of the combination pair, or takes the kerning correction value for the left side of the present character if it was previously calculated and stored. The total kerning correction of the present character is then defined, and the kerning correction for the left side of the next character is stored. The total kerning correction is then used in the program which repeats the processing for the next characters until the procedures for line end calculations are completed and the placement of characters on a line has been specified.

In step (II), the correction program accepts the assembled line of characters and corrects the contours of the Toles combination pairs. As is known conventionally, the contour of a character can be represented digitally by a series of linear or curved segments or "splines" which connect a set of chosen points along the outline of the character. To derive a character contour for typesetting, the typesetting program retrieves a stored vector of splines for a normalized character and computes the points of the output resolution. If the contour of a character is to be corrected, the segments or splines of the character are defined in accordance with Toles Bar, Toles Serif, and/or Toles Parallel correction functions using the correction parameters listed on the corresponding Toles tables.

The Toles correction functions of the invention will now be described. The conventional splines and the Toles points for a character are stored in memory portion C. The Toles connecting points are used to define the start and end of the contour of the bars, serifs, or parallel edges which may be corrected in each character. FIGS. 2(a)-(d) show examples of the Toles points for the bars and serifs of certain letters. The locations of the start (1) and end (2) points and the identity of the elements, i.e. bar or serif and location, are stored in memory. During a typesetting operation, the correction program checks whether the bar, serif, or parallel correction functions have been selected (see FIG. 4(a)). The program then executes a bar, serif, or parallel character to be corrected by applying the correction parameters to the contour of the element, stored in memory portion C, as defined between the Toles points.

Figure 6A:
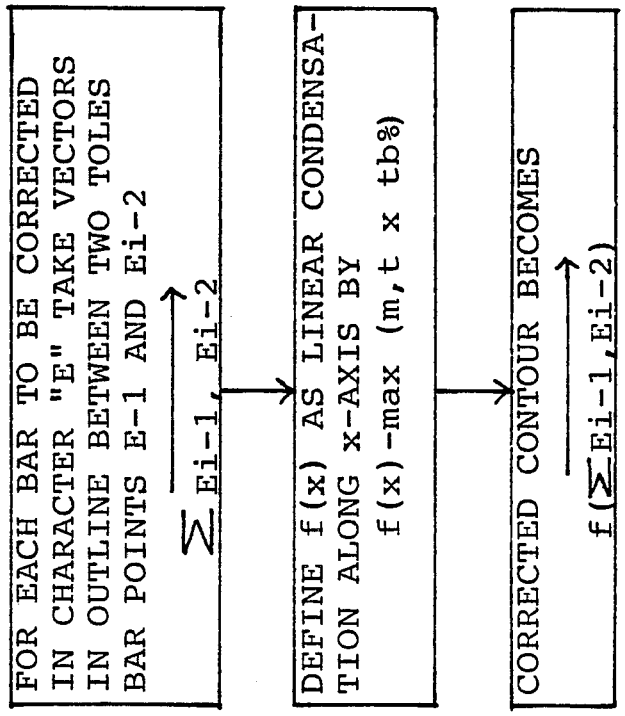
FIG. 6(a) is a flow chart of one embodiment of the bar correction subroutine illustrated in FIGS. 4(a)-(b)
Figure 6:
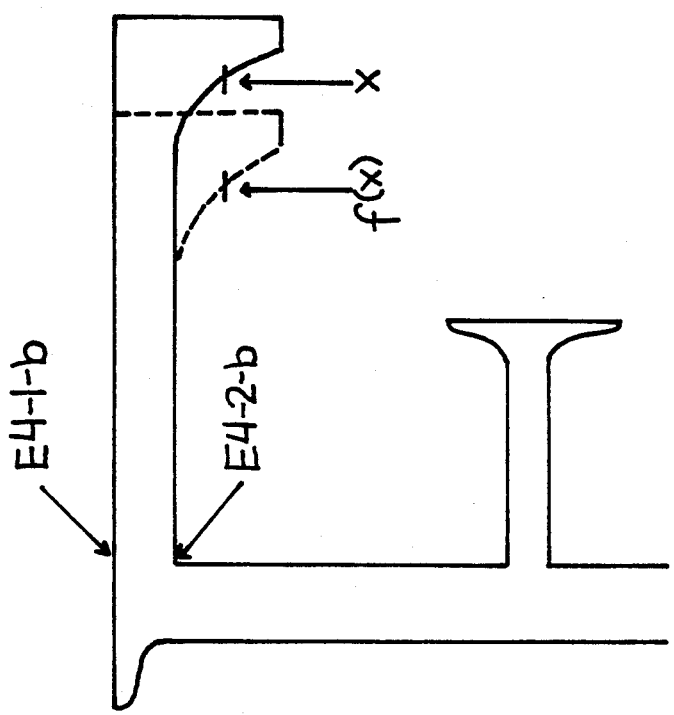
FIG. 6(b) shows an example of the application thereof.

FIG. 6(a) shows an example of a bar correction function for the upper right side bar of the letter "E" in FIG. 6(b). The bar is formed by the series of splines from point E4-1-b to point E4-2-b. The correction function f(x) is a linear condensation along the horizontal axis of the splines, using these points as reference points, by the higher of the maximum bar correction (M or m) and the bar correction percentage tb % multiplied by the t factor. The corrected contour is then stored, and the correction procedure is repeated until all bars for Toles pairs are corrected.

Figure 7A:
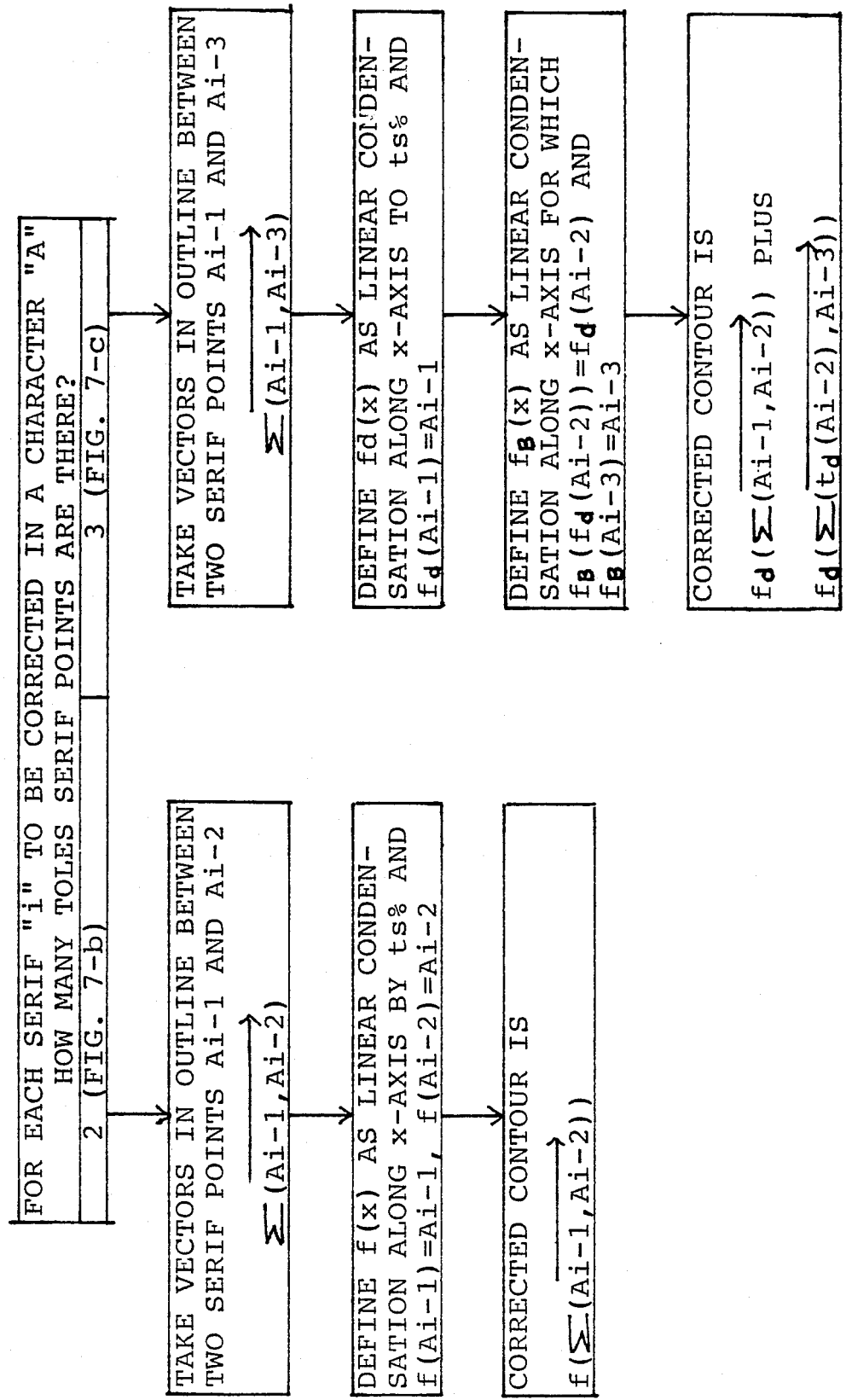
FIG. 7(a) is a flow chart of one embodiment of the serif correction subroutine illustrated in FIGS. 4(a)-(b), and FIGS. 7(b)-(c) show examples of the application thereof.
Figure 7C:
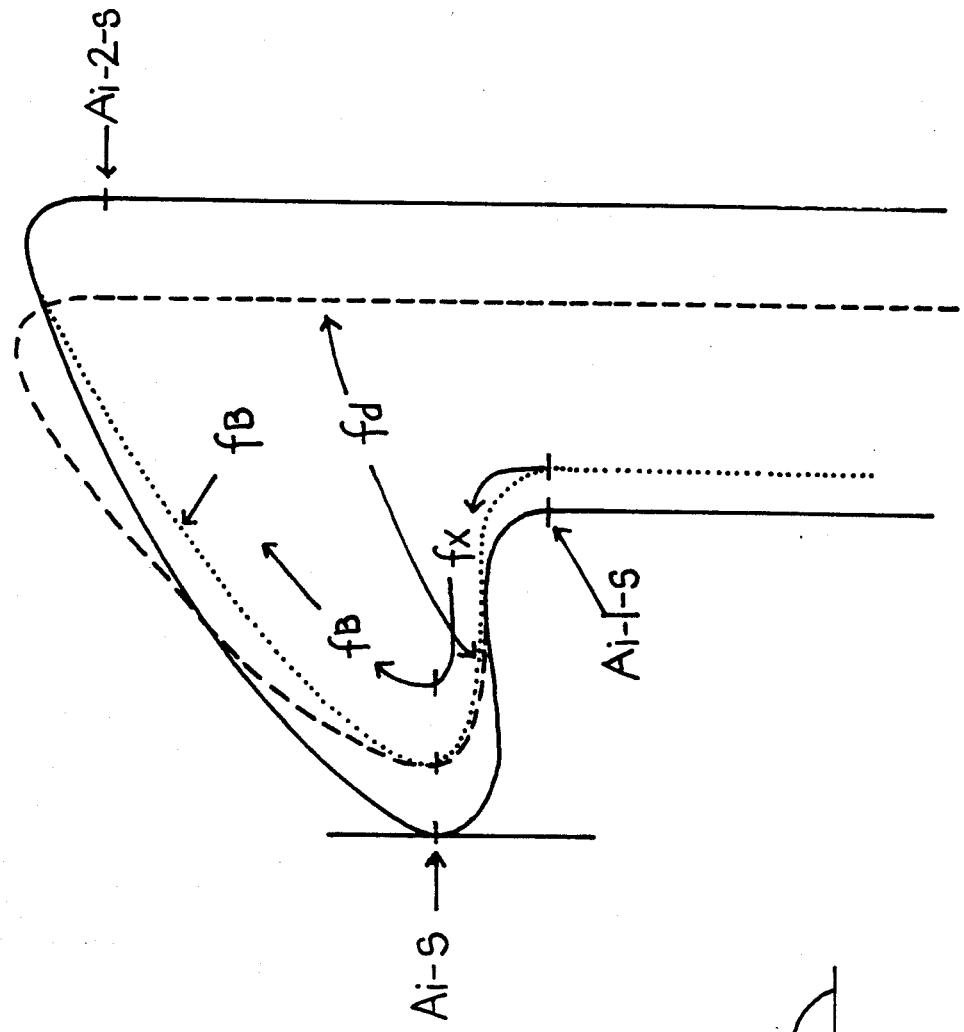
Figure 7B:
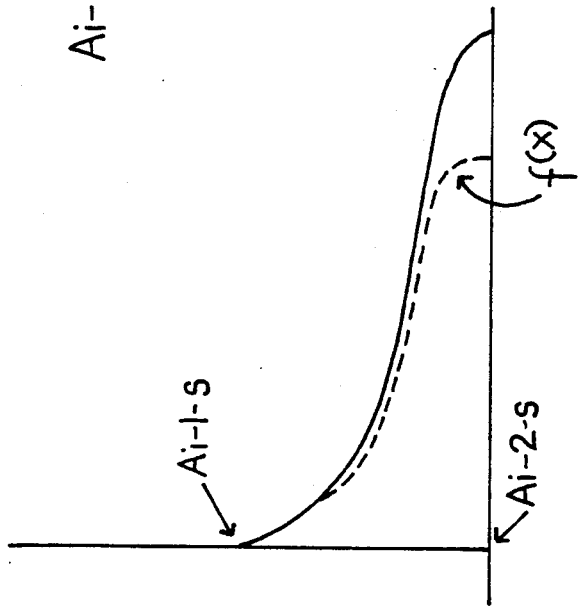

FIG. 7(a) shows an example of a serif correction function for a lower right side serif illustrated in FIG. 7(b) and an upper left serif in FIG. 7(c). If there are only two serif points (start and end) defined, as in FIG. 7(b), the serif correction function f(x) is a linear condensation of the contour by the correction amount ts % in the direction of the horizontal axis of all points defined by the reference points. In the case of a free-standing serif having a curved contour on two sides with three Toles serif points defined, as in FIG. 7(c), the serif correction function is the intersection of two partial linear condensations. In the example shown in FIG. 7(c), the serif contour extends from point Ai-1-s, through point Ai-s, to end point Ai-2-s. A first partial condensation function $f_\alpha(x)$ is taken from Ai-1-s to Ai-s using Ai-1-s as a reference point. Then a second partial condensation function $f_\beta(x)$ is taken from fα (Ai-s) to Ai-2-s using $f_\alpha$(Ai-s) as a reference point. The resulting serif correction is the combination of the two partial condensation functions. The serif correction procedure is repeated until all Toles pairs on the line have been processed.

Figure 8B:
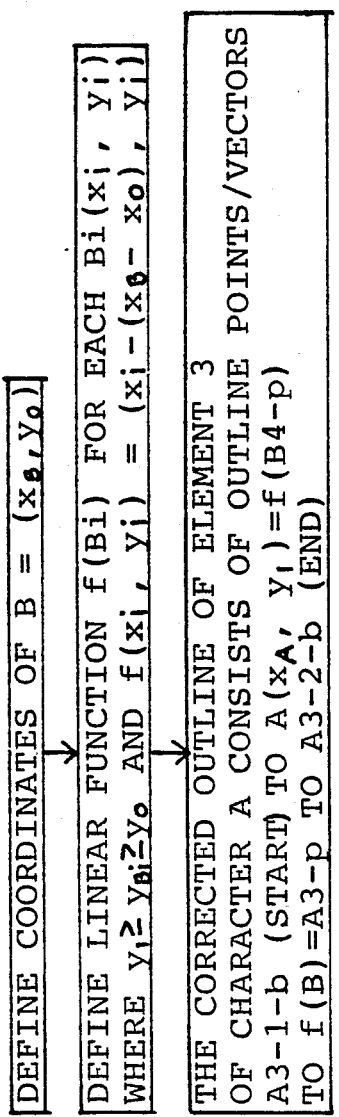
FIG. 8(b) shows an example of the application thereof.
Figure 8C:
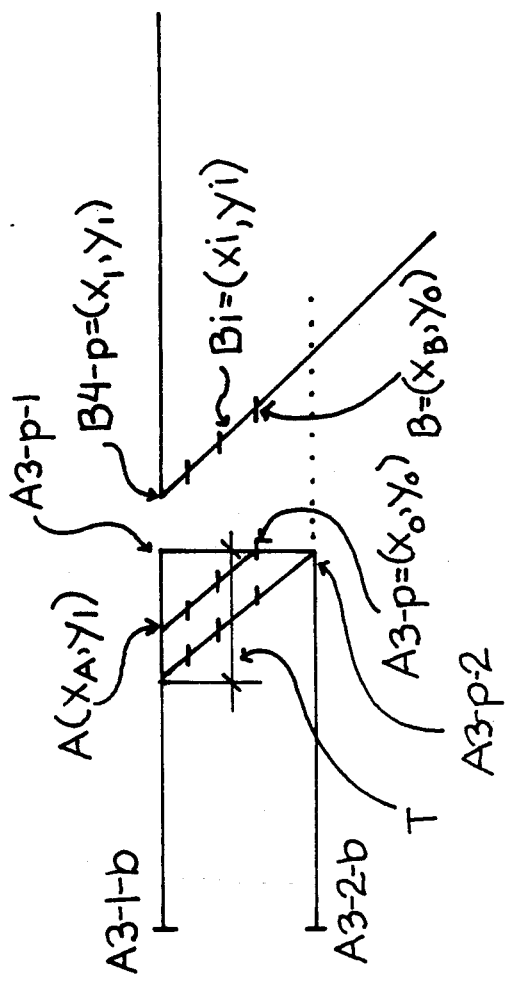
FIG. 8(a) is a flow chart of one embodiment of the parallel edge correction subroutine illustrated in FIGS. 4(a)-(b)

The Toles Parallel correction function is shown in FIG. 8(a), with an example in FIG. 8(b). Assuming that an element of the first character is to have its contour redefined to be parallel to an element of the second character, then the contour of the element of the second character is traced by shifting it to the left until it intersects with the starting point of the element of the first character. The intersection of the shifted contour tracing the second character with that of the first character defines the corrected contour of the right side of the first character. Alternatively, if the second character is to have its left side made parallel to the right side of the first, then the contour of the first is shifted to the right, and the left side of the second is redefined by the intersection of the shifted contour with its contour. The corrected contours are then stored, and the parallel correction procedure is repeated until all Toles pairs on the line have been processed.

In more detail, the correction function determines which character of a combination on the Toles Parallel Table has the "+" designation for an element whose contour is to be redefined parallel to the adjacent element of the other character. In FIG. 8(a), the example of the function to redefine element 3 of the character "A" is shown. First, the contour of element A3 is obtained between the Toles starting point A3-1-b and ending point A3-2-b. The contour of character "B" adjacent element A3 is also obtained. The reference contour point A3-p with coordinates $(x_o, y_o)$ of character "A" is then selected such that the length from point A3-p-1 to A3-p is the percentage tp % of the length from A3-p-1 to A3-p-2. Another reference contour point B4-p of character "B" is selected wherein its y-coordinate $y_1$ is equal to that of point A3-1-b. The points on the contour of character "B" having y-coordinates between $y_1$ and $y_0$ are then subject to the linear function f(B) in which $x_\beta - x_0$ is subtracted from the x-coordinates, resulting in redefined points for the element 3 of character "A" which are parallel to the contour of the character "B". The operation of the parallel correction function for elements of other types and positions follows a similar redefinition procedure.

When all character contours of Toles pairs have been corrected, the character vectors for the entire line are outputted in step (III) of the typesetting correction program for display, printing, phototypesetting, and/or storage. Although the correction program is described as operating first by determining the kerning corrections of the characters to fill a line, and then correcting for bars, then serifs, then parallel edges in serial processing for the entire line, it should be understood that these functions can be accomplished in alternative ways, e.g. by executing the functions character by character, or by performing the functions in a different order.

Figure 9A:
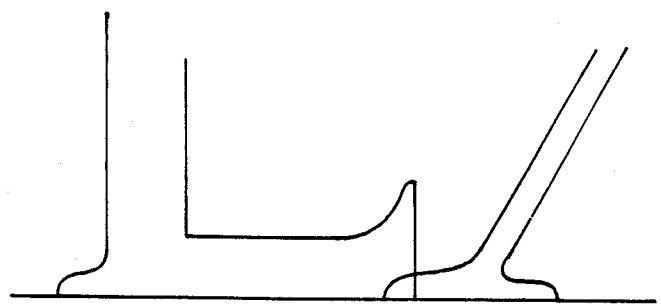
FIGS. 9(a)-(e) show the results of various combinations of the above correction subroutines for one character pair.
Figure 9B:
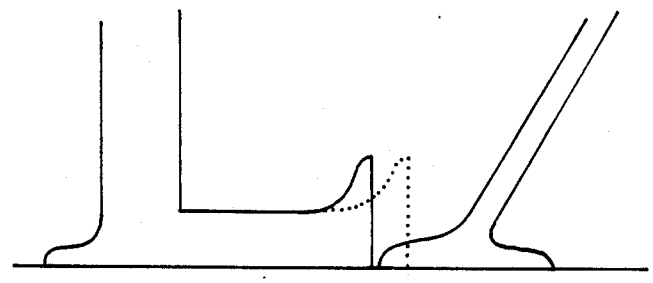
Figure 9C:
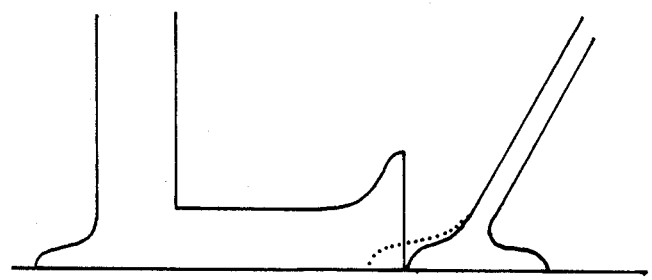
Figure 9D:
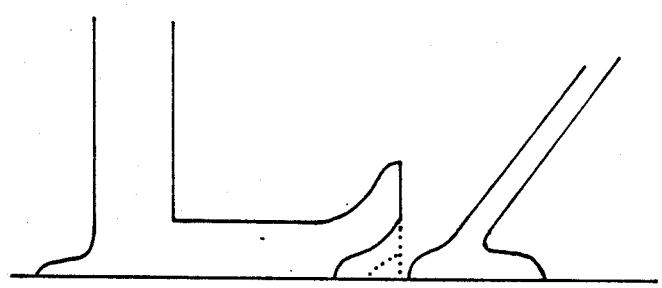
Figure 9E:
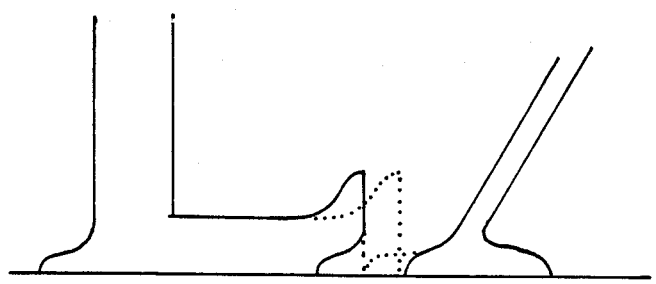

Some examples of the application of the different Toles correction functions are shown in FIGS. 9(a)-(e). FIG. 9(a) shows the letter pair "LA" in overlapping position as determined by the spacing of letters taking into account intended kerning corrections. FIG. 9(b) shows an example of the result if the correction parameters for this combination pair provide for a 15% reduction of the lower right side bar of the "L"; FIG. 9(c) shows a 50% serif correction of the lower left side of letter "A"; FIG. 9(d) shows a combination of 50% serif correction in letter "A" and 50% parallel correction in the letter "L"; and FIG. 9(e) shows a 50% serif correction in letter "A", and a 15% bar correction and 50% parallel correction in letter "L".

Figure 5A:
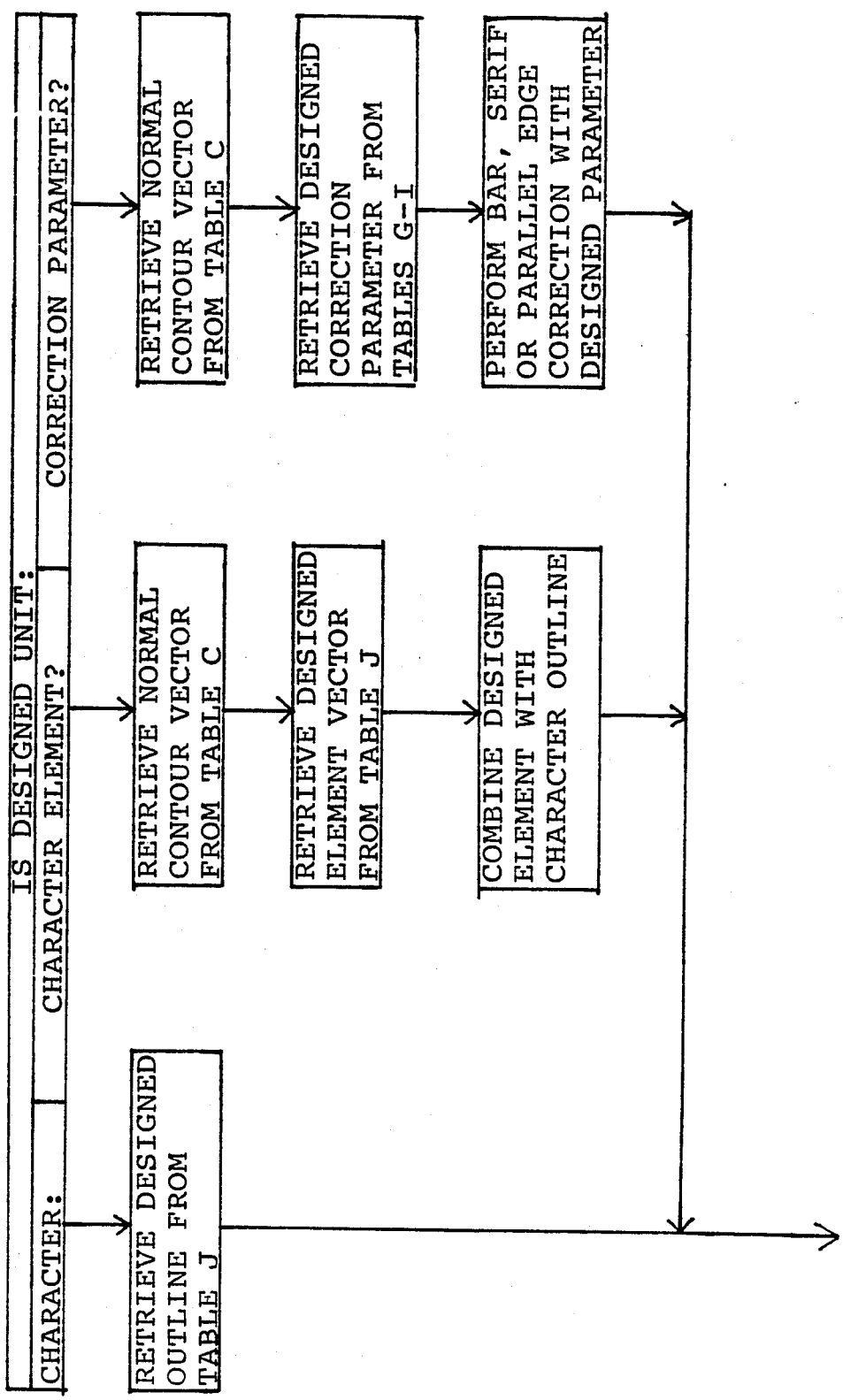
FIG. 5(a) is a flow chart for a correction program in the design mode according to the present invention.

In the design mode of correction, shown in FIG. 5(a), the designed contour representation of a whole character stored in Table J can be substituted for a character in an assembled line. For a designed character element or elements, the normalized contour from Table C is used and the contour of the designed element is substituted in place of the normal element, as indicated in FIG. 5(b). Alternatively, a design correction procedure can be performed, similar to the continuous mode bar, serif, or parallel edge correction procedures, by defining the outline of a character element or elements using the designed correction parameters, instead of the continuous mode correction parameters. The designed parameters for the correction of a character are stored in Toles Bar, Toles Serif, and/or Toles Parallel Tables G-I. Storing the whole contour of a character saves time in recalling and/or changing a designed character but requires more memory space.

The invention thus provides the advantages of great time savings from manual correction, ease of use, flexibility in specifying the amount of correction of letter combinations, and continuous and automatic correction by computer of a text to be typeset. The ability to specify, recall, and modify correction parameters also saves time on subsequent modifications. Further, the ability to do selective continuous corrections allows large amounts of text to be typeset with tighter spacing, enhanced legibility, and the pleasing appearance of equal optical spacing.

The invention can be incorporated in conventional high-volume in-house typesetting systems for books, newspapers, annual reports, etc., for use with a wide range of typestyles. It can also be adapted as software for general purpose or even personal computers. The design mode is also an advantageous feature for graphic design and advertising firms for specially designed logos and visual effects.

Figure 10:
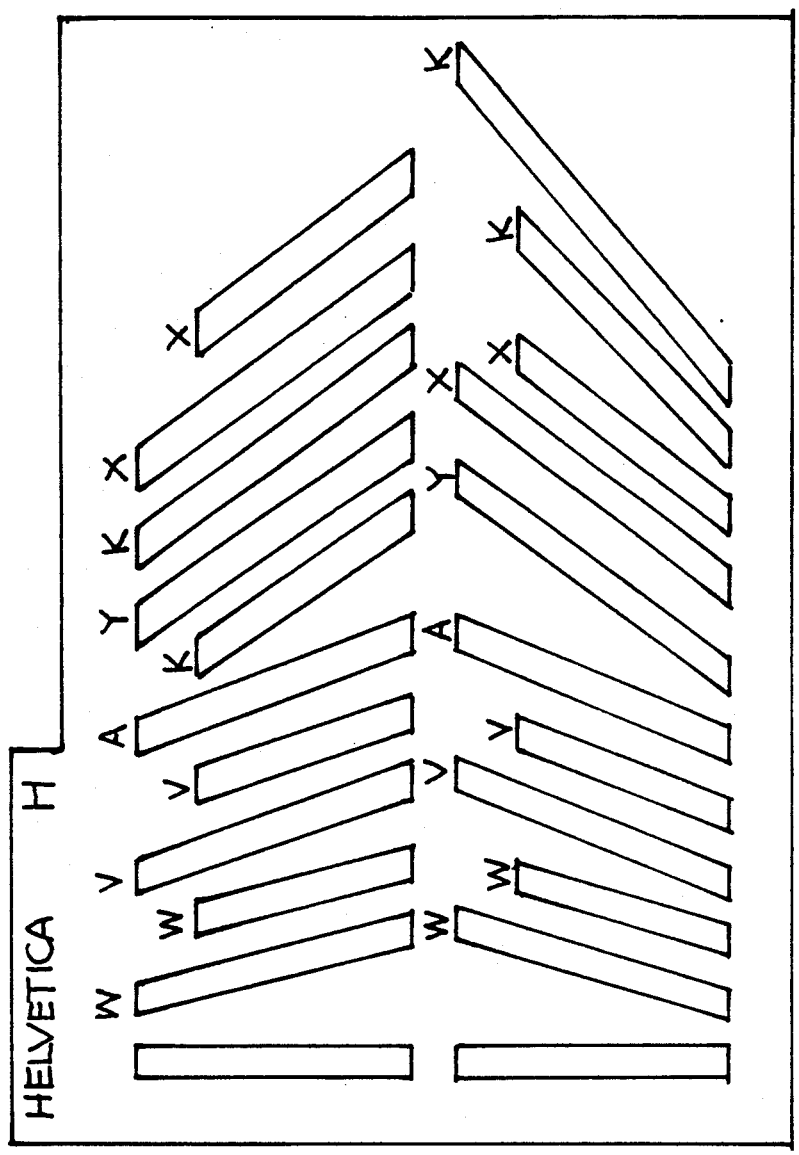
FIG. 10 illustrates one form of a template tool for manual typesetting in accordance with the principles of the invention.

The principles of the invention are also applicable to manual tools for typesetting. In FIG. 10, one form of a template is shown for forming selected characters that are modified according to the above-described Toles Bar and Toles Parallel correction methods for improved visual appearance. The template is used, for example, to cut presstype segments for characters from an inked medium on a transfer sheet. A template is designed for a given sans-serif typestyle, such as Helvetica. On the template, a series of guide slots are provided at selected angles for forming characters with predetermined bar lengths and parallel edges. For example, in FIG. 10, the bars of selected Helvetica font characters, i.e. A, K, V, W, Y, X, K, which may appear in awkward combinations with other characters, are outlined so that they can be traced and parallel corrections performed. Templates for other typefaces may also be provided to comprise a system of templates for manual typesetting.

Figure 11:
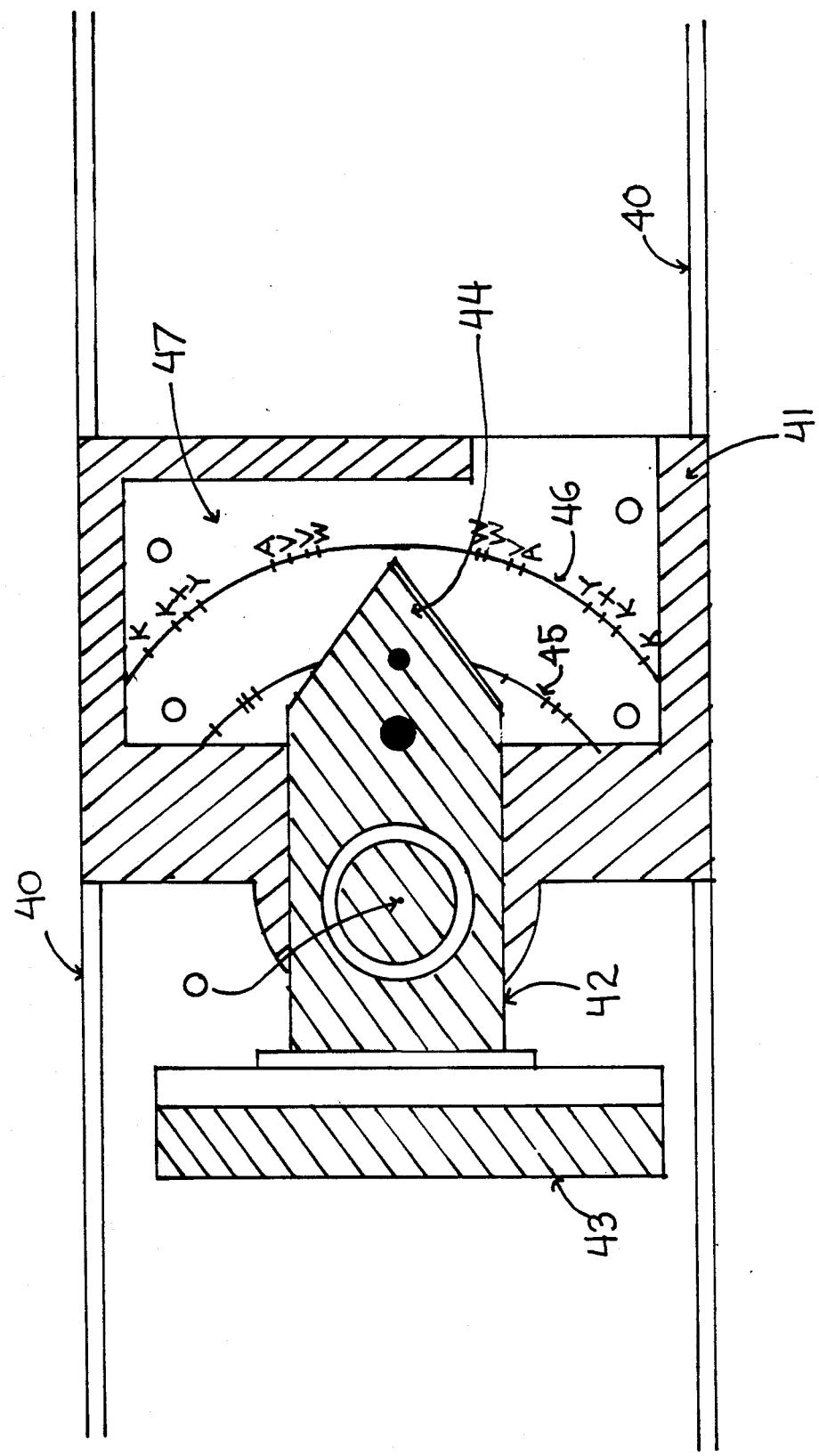
FIG. 11 shows a typositor tool of the invention for use in photographic typesetting.

Another application is a typositor mask tool shown in FIG. 11 for masking the optical exposure of type images in photographic typesetting. As used conventionally, a character image of a selected typestyle carried on a film medium is projected onto photographic film or paper to a selected point size. The typositor has a pair of parallel guides 40 for moving the tool parallel to a reference axis. A carriage 41 is mounted on guides 40 and has a mask section 42 pivotally secured at a central axis point 0. One end of the mask section has a straight edge 43 which can be superimposed over a part of the projected outline of a character in order to block out part of the exposure beam. Thus, the typositor can be used to shorten the length of a bar or to form an angled edge contour parallel to that of an adjacent character. On the opposite side of the mask section is a pointer 44 which indicates the angle of inclination of the straight edge on arc measure 45 provided on a template 47. A second arc 46 designates the angle of inclination for the contour segments of selected characters of a given typestyle, e.g. Helvetica, which are to be formed. The template 47 can be made interchangeable on carriage 41 and provided for a series of typestyles.

Although some of the preferred embodiments of the invention are described above, it should be understood that many variations and modifications are possible within the principles of this invention. All such variations and modifications are intended to be included within the scope of the invention, as defined in the following claims.

I claim:

1. In a digital typesetting system of the type having a computer for executing a typesetting program, a memory for storing digital contour representations of a plurality of characters of at least one typestyle, a keyboard for entering data identifying characters to be typeset, wherein the characters are to be typeset positioned serially adjacent one another in a line extending in a serial direction, and each character has a contour which includes an intermediate portion and opposite side portions on opposite sides of said intermediate portion in the serial direction, a character width associated therewith, and a selected spacing from an adjacent character, said typesetting program having a mode for determining the widths and spacings of characters and assembling a line of characters of a selected total line width to be typeset, and means for providing an output of contours of said assembled characters corresponding to said contour representations stored in memory, and further wherein at least some of said assembled characters have edge elements on side portions of their contours which become juxtaposed with edge elements on facing side portions of respective adjacent characters.

the improvement of a typesetting correction system comprising:

(a) a first portion of said memory for storing correction data on a correction table representing combination pairs of adjacent characters, wherein each combination pair has juxtaposed edge elements of which at least one of the characters has an edge element of its contour to be corrected;

(b) means including a first program section executed on said computer for comparing characters input on said keyboard with said correction table stored in said first portion of said memory, for identifying combination pairs of adjacent characters each having at least one contour edge element to be corrected, and for obtaining correction data from said correction table related to correcting the at least one edge element for each identified combination pair; and (c) means including a second program section executed on said computer for performing a correction function for correcting the contour representation of the at least one edge element of each said identified combination pair in accordance with the associated correction data.

2. A digital typesetting system according to claim 1, wherein said correction function includes a first function for reducing a width of an edge element of a character of a combination pair by a specified amount.

3. A digital typesetting system according to claim 1, wherein said correction function includes a parallel edge function for defining the contour representation of an edge element of a character of a combination pair to be parallel to the contour representation of an adjacent edge element of the other character of said pair.

4. A digital typesetting system according to claim 1, wherein said typesetting program is adapted to assemble characters to be typeset line by line, and said first and second program sections operate to identify and correct the contour representations for characters in identified combination pairs for a line at a time.

5. A digital typesetting system according to claim 1, further comprising means including an input from said keyboard for selecting a correction function and a corresponding correction amount to be applied automatically by said second program section for correcting edge elements of characters in combination pairs in a text to be typeset in accordance with said selected correction function.

6. A digital typesetting system according to claim 1, wherein said output means includes a phototypesetting apparatus for printing a phototypeset record of said output contour representations of said assembled line of characters including said corrected contour representations.

7. A digital typesetting system according to claim 1, further comprising a second portion of said memory for storing a contour representation of a character element, character, or character combination pair according to a predetermined design, said first program section including means for identifying said character element, character, or character combination pair from said input characters, and said second program section including means for recalling said stored designed representation corresponding thereto from said second memory portion.

8. A computerized typesetting correction system comprising:

(a) input means including a keyboard for inputting data identifying characters to be typeset, wherein the characters are to be typeset positioned serially adjacent one another in a line extending in a serial direction, and each character has a contour which includes an intermediate portion and opposite side portions on opposite sides of said intermediate portion in the serial direction, a character width associated therewith, and a selected spacing from an adjacent character, and further wherein at least some of said characters have edge elements on side portions of their contours which become juxtaposed with edge elements on facing side portions of respective adjacent characters;

(b) a first memory portion for storing data on widths and spacings assigned to a plurality of characters of a typestyle;

(c) a second memory portion for storing representations of the contours of the characters of said typestyle;

(d) a third memory portion for storing correction data on a correction table representing combination pairs of adjacent characters, wherein each combination pair has juxtaposed edge elements of which at least one of the characters has an edge element of its contour to be corrected;

(e) computer means for executing a typesetting program, said typesetting program having a mode for determining the widths and spacings of input characters based on said data in said first memory portion, and for assembling a plurality of said input characters in a typesetting unit of a specified total line width;

(f) means including a first program section of said typesetting program for comparing the input characters with said correction table of said third memory portion for identifying combination pairs of adjacent characters having contour edge elements to be corrected;

(g) means including a second program section of said typesetting program for performing a specified correction function to correct the contour representation stored in said second memory portion for the edge element to be corrected of each said identified combination pair in accordance with the corresponding correction data stored in said third memory portion; and (h) output means for providing a typeset output of contours based on the contour representations, including said corrected contour representation, for said assembled characters in said typesetting unit.

9. A computerized typesetting correction system according to claim 8, wherein said correction function includes a function for reducing a width of an edge element of a character by a specified amount.

10. A computerized typesetting correction system according to claim 9, wherein the correction amount input on said keyboard represents a percentage amount of linear reduction of the width of edge elements of characters in identified combination pairs.

11. A computerized typesetting correction system according to claim 8, wherein said correction function includes a parallel edge function for defining the contour representation of an edge element of one character of a combination pair to be parallel to the contour representation of an adjacent edge element of the other character of said pair.

12. A computerized typesetting correction system according to claim 8, wherein said typesetting program is adapted to assemble characters to be typeset line by line, and said first and second program sections identify and correct the contour representations for edge elements of identified combination pairs for a line at a time.

13. A computerized typesetting correction system according to claim 8, further comprising means including an input from said keyboard for selecting a correction function and a correction amount to be applied automatically by said second program section for correcting edge elements of characters in combination pairs in a text to be typeset in accordance with said selected correction function.

14. A computerized typesetting correction system according to claim 13, wherein correction data for correcting the edge elements of characters in identified combination pairs are stored on said correction table in said second memory portion, and said correction data and said selected correction function and correction amount are automatically applied to the edge elements of characters in identified combination pairs.

15. A computerized typesetting correction system according to claim 8, wherein said width and spacing data stored in said first memory portion includes data on the widths of the edge elements of characters in identified combination pairs which are to be corrected, and said assembling mode of said typesetting program executed by said computer means includes means for calculating corrected widths and spacings for characters in combination pairs identified in said first program section.

16. A computerized typesetting correction system according to claim 8, wherein said second program section executes a plurality of correction functions for edge elements of identified combination pairs, including reducing a bar width, a serif width, and defining a contour representation of one character to be parallel to the contour representation of an adjacent character, and said second memory portion includes correction data on a plurality of correction tables each corresponding to a respective correction function.

17. A computerized typesetting correction system according to claim 8, further comprising a fourth portion of said memory for storing a contour representation of a character element, character, or character combination pair according to a predetermined design, said first program section including means for identifying said character element, character, or character combination pair from said input characters, and said second program section including means for recalling said stored designed representation corresponding thereto from said fourth memory portion.

18. In a computerized typesetting method for a system including a computer for executing a typesetting program for assembling characters to be typeset, wherein the characters are to be typeset positioned serially adjacent one another in a line extending in a serial direction, and each character has a contour which includes an intermediate portion and opposite side portions on opposite sides of said intermediate portion in the serial direction, and further wherein at least some of said assembled characters have edge elements on side portions of their contours which become juxtaposed with edge elements on facing side portions of respective adjacent characters, a memory including a first portion for storing contour representations of a plurality of characters of a typestyle, a keyboard for inputting data identifying characters to be typeset, and means for providing an output of typeset characters based upon said contour representations stored in said memory for said assembled characters, the improvement comprising the steps of:

(a) storing correction data on a correction table in a second portion of said memory representing combination pairs of adjacent characters, wherein each combination pair has juxtaposed edge elements of which a character has an edge element of its contour to be corrected;

(b) specifying a correction function to be applied to an edge element of at least one of the characters in each combination pair represented on said correction table stored in said second memory portion;

(c) operating a first typesetting program section on said computer for comparing input characters with combination pairs represented on said correction table and identifying combination pairs of adjacent characters each having a contour edge element to be corrected; and (d) operating a second typesetting program section on said computer for performing said specified correction function for correcting the contour representation of the edge element of the at least one character in each identified combination pair in accordance with corresponding correction data stored in said second memory portion.

19. A computerized typesetting correction method according to claim 18, wherein said correction function includes a first function for reducing a width of an edge element of a character of a combination pair by a specified amount.

20. A computerized typesetting correction method according to claim 18, wherein said correction function includes a parallel edge function for defining the contour representation of an edge element of one character of a combination pair to be parallel to the contour representation of the adjacent edge element of the other character of said pair.

21. A computerized typesetting correction method according to claim 18, including the step of determining widths and spacings of input characters and assembling characters to be typeset for a line of specified total width.

22. A computerized typesetting correction method according to claim 18, further comprising the step of selecting a correction function and a correction amount to be automatically applied to a text of input characters for identified combination pairs represented on said correction table.

23. A computerized typesetting correction method according to claim 18, further comprising the steps of storing a contour representation of a character element, character, or character combination pair according to a predetermined design in a third portion of said memory, operating said first program section for identifying said character element, character, or character combination pair from said input characters, and operating said second program section for recalling said stored designed representation corresponding thereto from said third memory portion.

24. In a digital typesetting system of the type having a computer for executing a typesetting program, a memory for storing digital contour representations of a plurality of characters of at least one typestyle, a keyboard for entering data identifying characters to be typeset, wherein the characters are to be typeset positioned serially adjacent one another in a line extending in a serial direction, and each character has a contour which includes an intermediate portion and opposite side portions on opposite sides of said intermediate portion in the serial direction, a character width associated therewith, and a selected spacing from an adjacent character, said typesetting program having a mode for determining the widths and spacings of characters and assembling a line of characters of a selected total line width to be typeset, and means for providing an output of contours of said assembled characters corresponding to said contour representations stored in memory, and further wherein at least some of said assembled characters have edge element on side portions of their contours which become juxtaposed with edge elements on facing side portions of respective adjacent characters, the improvement of a typesetting correction system comprising:

(a) a first portion of said memory for storing correction data on a correction table for each combination pair of adjacent characters having juxtaposed edge elements of which at least one of the characters has an edge element of its contour to be corrected, each said correction data including an address portion specified by said combination pair, an edge element portion identifying the edge element of the contour of the at least one character of the pair to be corrected, and a correction value portion specifying the correction value amount by which said edge element is to be corrected;

(b) means including a first program section executed on said computer for comparing characters input on said keyboard with said correction table stored in said first portion of said memory, for identifying each combination pair of adjacent characters which corresponds to an address portion of correction data on said correction table, and for retrieving the respective edge element portion and correction value portion of said correction data which corresponds to said address portion addressed by each said combination pair; and (c) means including a second program section executed on said computer for performing a correction function for correcting the contour representation of the edge element of each said identified combination pair identified by said retrieved edge element portion by the amount specified by said correction value portion of said correction data.

25. In a method of performing digital typesetting in a system having a computer for executing a typesetting program, a memory for storing digital contour representations of a plurality of characters of at least one typestyle, a keyboard for entering data identifying characters to be typeset, wherein the characters are to be typeset positioned serially adjacent one another in a line extending in a serial direction, and each character has a contour which includes an intermediate portion and opposite side portions on opposite sides of said intermediate portion in the serial direction, a character width associated therewith, and a selected spacing from an adjacent character, said typesetting program having a mode for determining the widths and spacings of characters and assembling a line of characters of a selected total line width to be typeset, and means for providing an output of contours of said assembled characters corresponding to said contour representations stored in memory, and further wherein at least some of said assembled characters have edge elements on side portions of their contours which become juxtaposed with edge elements on facing side portions of respective adjacent characters, the improvement of a typesetting correction method comprising the steps of:

(a) storing correction data on a correction table in a first portion of said memory for each combination pair of adjacent characters has an edge element of its contour to be corrected, each said correction data including an address portion specified by said combination pair, an edge element portion identifying the edge element of the contour of the at least one character of the pair to be corrected, and a correction value portion specifying the correction value amount by which said edge element is to be corrected;

(b) comparing characters input on said keyboard with said correction table stored in said first portion of said memory, identifying each combination pair of adjacent characters which corresponds to an address portion of correction data on said correction table, and retrieving the respective edge element portion and correction value portion of said correction data which corresponds to said address portion addressed by each said combination pair; and (c) performing a correction function for correcting the contour representation of the edge element of each said identified combination pair identified by said retrieved edge element portion by the amount specified by said correction value portion of said correction data.

* * * * *